United States Patent [19]

Mikami et al.

[11] Patent Number: 4,633,269

[45] Date of Patent: Dec. 30, 1986

[54] METHOD AND APPARATUS FOR HEATING THERMAL HEAD

[75] Inventors: Tomohisa Mikami, Machida; Tsugio Noda, Kawasaki, both of Japan

[73] Assignee: Fujitsu Limited, Kawasaki, Japan

[21] Appl. No.: 851,261

[22] Filed: Apr. 9, 1986

Related U.S. Application Data

[63] Continuation of Ser. No. 703,986, Feb. 21, 1985, abandoned.

[51] Int. Cl.⁴ .............................................. G01D 15/10

[52] U.S. Cl. ................................ 346/76 PH; 400/120

[58] Field of Search .................... 346/76 PH; 400/120; 219/216 PH

[56] References Cited

U.S. PATENT DOCUMENTS 4,071,849 6/1978 Koyano et al. ................ 346/76 PH
4,415,908 11/1983 Sugiura .......................... 346/76 PH
4,494,126 1/1985 Todoh ............................ 346/76 PH
4,523,203 6/1985 Adkisson et al. .............. 346/76 PH

FOREIGN PATENT DOCUMENTS 0205179 12/1982 Japan .............................. 346/76 PH
0031781 2/1983 Japan .............................. 346/76 PH

*Primary Examiner*—Arthur G. Evans
*Attorney, Agent, or Firm*—Staas & Halsey

[57] ABSTRACT

In a thermal printer which conducts recording by heating heat generating elements with a drive signal, the temperature of the heat generating elements, after a specified period for the start of a thermal recording signal can be returned to a constant value, by applying during the normal cooling process, that is, after application of a thermal recording signal, a predetermined auxiliary pulse corresponding to the temperature that is generated during the thermal recording and to the tone to be recorded.

15 Claims, 20 Drawing Figures

METHOD AND APPARATUS FOR HEATING THERMAL HEAD

This is a continuation of co-pending application Ser. No. 703,986 filed on Feb. 21, 1985, now abandoned.

BACKGROUND OF THE INVENTION

The present invention relates to a method and apparatus for heating a thermal head of a thermal printer, and particularly for accurately heating the thermal head to a target temperature.

A thermal printer which records data such as letters can be classified into a thermo-sensitive and thermo-ink-transfer recording systems. The former realizes recording by changing the color of the recording paper through heating of a heat generating body of a thermal head while the thermal head is directly in contact with said recording paper, which changes color when it is heated, while the latter realizes recording by heating the ink with the thermal head to dissolve or vaporize it for transferring the ink to the recording paper.

FIG. 1 shows the outline of a thermo-transfer recording unit of a line recording system. FIG. 2 shows the structure of the thermal head. The thermal head 11 faces a platen 14 through an ink sheet 12 and a recording paper 13. The ink of the ink sheet 12 melts when it is heated by the thermal head 11, and it is transferred to a recording paper 13 for the recording. The thermal head 11 has a heat generating body for each single line arranged along the direction perpendicular to the paper surface, and recording of each single line is carried out almost simultaneously. Upon completion of recording of a single line, the recording paper 13 and ink sheet 12 are transferred simultaneously in the direction indicated by the arrow.

The thermal head 11 has the multi-layer structure as shown in FIG. 2. Namely, a glaze layer 24, a heat generating body 23 and an electrode 22 are provided in a layer structure on a substrate 25, and a protection layer 21 is provided at the surface in contact with the recording paper. 26 is a heat sink.

When multi-level recording is to be carried out using such a thermal head, a particular problem arises, which cannot be foreseen in the existing binary level recording. Explanation is made hereunder for this problem in order to understand the background of the present invention more easily.

Namely, the problem is that the allowable range of heating temperature for temperature control of a thermal head is narrow, the temperature control must be done accurately, and it is difficult to realize accurate temperature control.

FIG. 3 is given for convenience in explaining such a problem. Here, the term binary level recording refers to the recording mode where recording is conducted in black or white by the thermal head, while the term multi-level recording refers to the recording mode wherein recording is conducted with densities of intermediate tone in accordance with the recording temperature.

FIG. 3 shows the relation between temperature and recording density, wherein the horizontal coordinate plots target temperature T while the vertical coordinate plots recording density D. In thermal recording, recording density corresponds to time of applying the temperature. However, for a brief explanation, the recording density is explained as corresponding only to the level of the temperature in FIG. 3.

In the temperature control for binary level recording, it is sufficient to control the recording to be black or not. It is sufficient to respectively control the temperature within the allowable temperature region $\Delta T_1$ for the white area, and within the allowable temperature region $\Delta T_2$ for the black area of the recording medium.

In this case, both $\Delta T_1$ and $\Delta T_2$ are widths of the temperature range and it is enough to control the heating temperature of the heat generating element of the thermal head so that it is restricted to such widths.

On the other hand, in the case of three-level recording in the multi-level recording temperature control, if it is required to obtain the recording densities $D_a$, $D_b$ and $D_c$, the temperature must be set respectively up to the target temperatures $T_a$, $T_b$, $T_c$, and the widths of allowable temperature $\Delta T_a$, $\Delta T_b$, $\Delta T_c$ become very narrow. The multi-level recording requires controlling the temperature in the narrow allowable ranges. Examples of actual allowable temperature ranges are indicated below.

In binary level recording by a thermal printer in which the line period is 5 msec and the time for pressing the thermal head to the recording paper after it is heated to the specified temperature is 1 msec, $T_1$ is set to 80° C. (20° C. 100° C.) and $T_2$ is set to 150° C. (150° C. 300° C.).

On the other hand, in the multi-level recording by the thermal printer where the line period is set to 5 msec, and the time for pressing the thermal head to the recording paper after it is heated to the specified heating temperature is set to 1 msec, the maximum allowable temperature range is 3° C. in case the temperature range from 100° C. to 150° C. is divided into 16 tones (16 levels).

The problem in the temperature control for multi-level recording is explained in detail with reference to FIG. 4.

In FIG. 4, the vertical coordinate indicates temperature T, while the horizontal coordinate indicates time t. The time charts indicated by waveforms (a), (b) and (c) show the drive signal for heating to be applied to a heat generating element of the thermal head.

It is assumed that the thermal recording is carried out in the period from time $t_0$ to time $t_1$.

The temperature of the heat generating element rises as indicated by a curve shown in FIG. 4.

When the drive pulses $P_a$, $P_b$, $P_c$ having the widths $W_a$, $W_b$, $W_c$ indicated by waveforms (a), (b), and (c) in FIG. 4 are applied to the heat generating element, the heat generating element is heated up to the temperature A, B, and C at the time $t_a$, $t_b$, $t_c$.

The densities corresponding to the temperatures A, B, and C can be obtained as the recording densities.

The heat generating element is heated to any of the temperatures $T_a$, $T_b$, $T_c$ ($T_a > T_b > T_c$) by the time $t_1$, namely at the end of the recording period.

Since in the past the stored thermal energy of the heat generating element is different accordance with the drive condition of the drive signal, the temperature of the heat generating material is different at the end of the recording period.

Namely, at the time of starting the drive signal for the next heating, a temperature difference already exists due to the difference of stored thermal energy.

When temperature differences at the time of starting the drive signal are generated as explained above, it is very difficult to accurately control the temperature up to the target heating temperature.

In such a case, it was attempted to control the power application of the next recording pulse signal in accordance with the temperature history, namely, the past temperature of the heat generating element for recording, in order to accurately control the temperature up to the target heating temperature. This is referred to as the temperature history system. In the case of binary recording by this system, if the preceeding recording is black, the pulse width of the drive signals to be applied to the heat generating element is more curtailed than in the case of white, or the pulse amplitude is made smaller and thereby the supplied power is reduced.

As explained above, the change of recording density due to stored heat of the thermal head can be reduced by employing the temperature history system, but this system has the following disadvantage. In the temperature history system, it is essential to obtain the desired temperature of the heat generating element at the starting time of each successive period recording by applying the past drive conditions to the theoretical equations for the heating and cooling characteristics, and to obtain the condition of the drive signal corresponding to the amount of heat to be supplied from such temperature. This calculation is very complicated, for instance it includes an exponential function, and it is necessary to apply such calculations to all the heat generating elements provided to the thermal head (for example, when the recording paper is size A4 with 8 dots/mm, 1680 heat generating elements are necessary), and a circuit for realizing high speed calculation is also required.

The more the temperature history in the past is relied on, the more the error of recording density due to the stored heat is reduced, however, it costs more time to calculate a longer history.

Moreover, the recording period of a heat generating element is not constant, because the recording is conducted at a high speed and the instantaneous power consumption is limited. Consideration must be taken for change in the recording period in order to calculate the conditions of the drive signal from the drive conditions in the past. The calculation is complicated and the drive conditions are remarkably diverse.

In the following example, the temperature controls for binary recording and multi-level recording are compared with reference to the calculation time and the amount of calculations.

For calculation of history from the preceeding five time slots, $2^5$ calculations are necessary in the case of binary control, but almost $10^6$ calculations ($16^5$) are necessary for the multi-level control of 16 levels which is an object of the present invention. Namely, the amount of calculations for multi-level control is about 30,000 times the binary level control.

This means that a significant calculation time is required when the thermal recording speed is considered.

Namely, since the next drive signal cannot be applied before completion of calculation of the thermal history, the recording period is substantially lowered. Moreover, a high speed and high precision operation circuit is required.

SUMMARY OF THE INVENTION

Focusing on such points, the present invention provides a method and apparatus for heating the thermal head to control the degree of heating at a high speed with a high precision, by controlling temperature change of a heat generating body by the stored heat energy, and without conducting calculations for compensating for a change of recording density due to the heat stored in the thermal head.

The present invention successfully eliminates the effect of temperature differences, resulting from stored energy, on the successive recording period, by cancelling the change of stored heat during each recording period within said recording period. Namely, the temperature history of the heat generating element can be deleted and successive temperature characteristics of the heat generating element can be determined without relation to stored heat energy, by controlling the temperature of the heat generating element at a predetermined time from the recording start time to be a constant value. Moreover, for changing the recording period, the heat generating element temperature at the next recording start time can be set to a constant value by controlling the drive conditions of the drive signal in accordance with the time from said predetermined time to the recording start time, and thereby a change of stored heat of the heat generating element due to the change of the recording period can be set, irrespective of successive temperature characteristics of the heat generating element.

DESCRIPTION OF PREFERRED EMBODIMENTS

The principle of the present invention is explained hereunder.

FIGS. 5, 6, 7 and 8 are graphs which illustrate the temperature characteristics of the heat generating elements to which the heating method of this invention is applied. The vertical coordinate and the horizontal coordinate in the graphs shown in FIGS. 5, 6, 7 and 8 indicate temperature T and time t, respectively.

Figure 1:
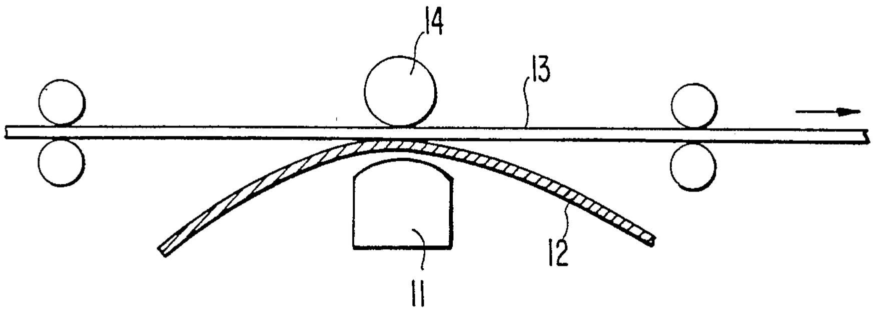
FIG. 1 indicates a thermo-transfer recording unit of a line recording system.
Figure 2:
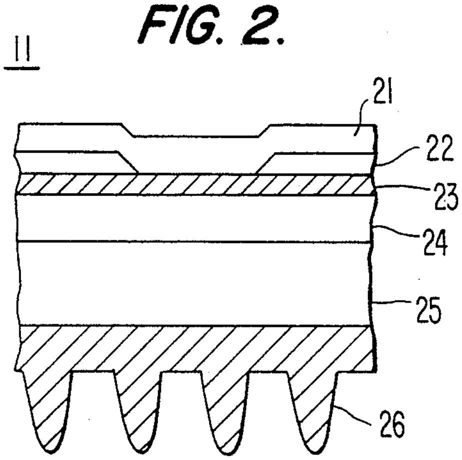
FIG. 2 shows the structure of the thermal head.
Figure 3:
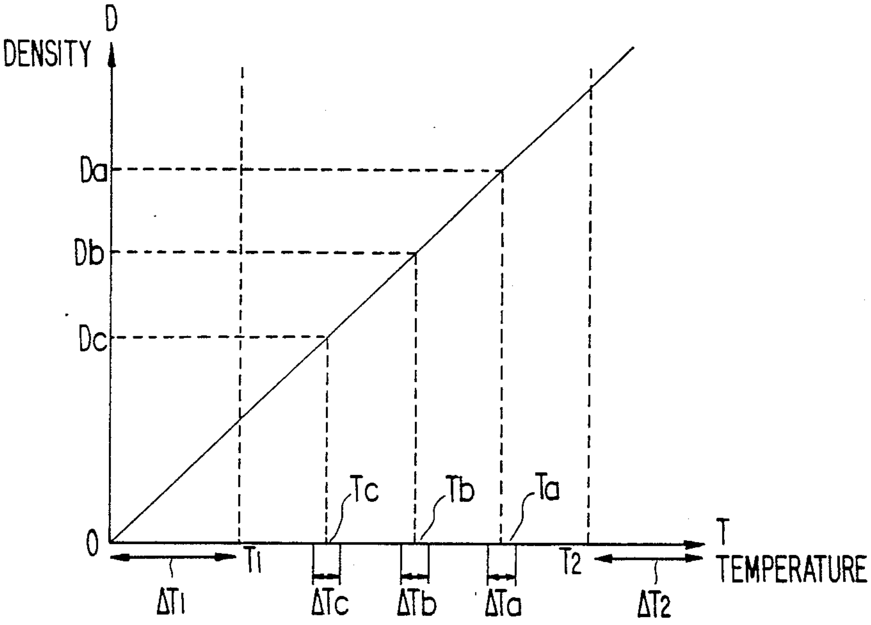
FIG. 3 shows the relation between temperature and recording density.
Figure 4:
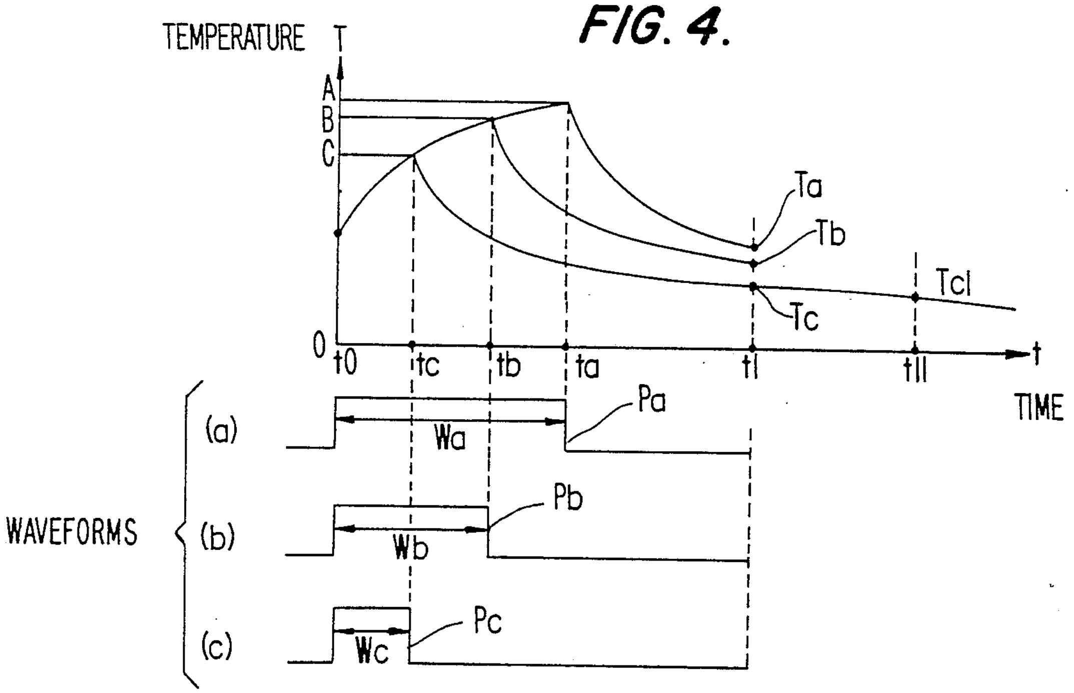
FIG. 4 illustrates the problem of the temperature control for multi-level recording.
Figure 5:
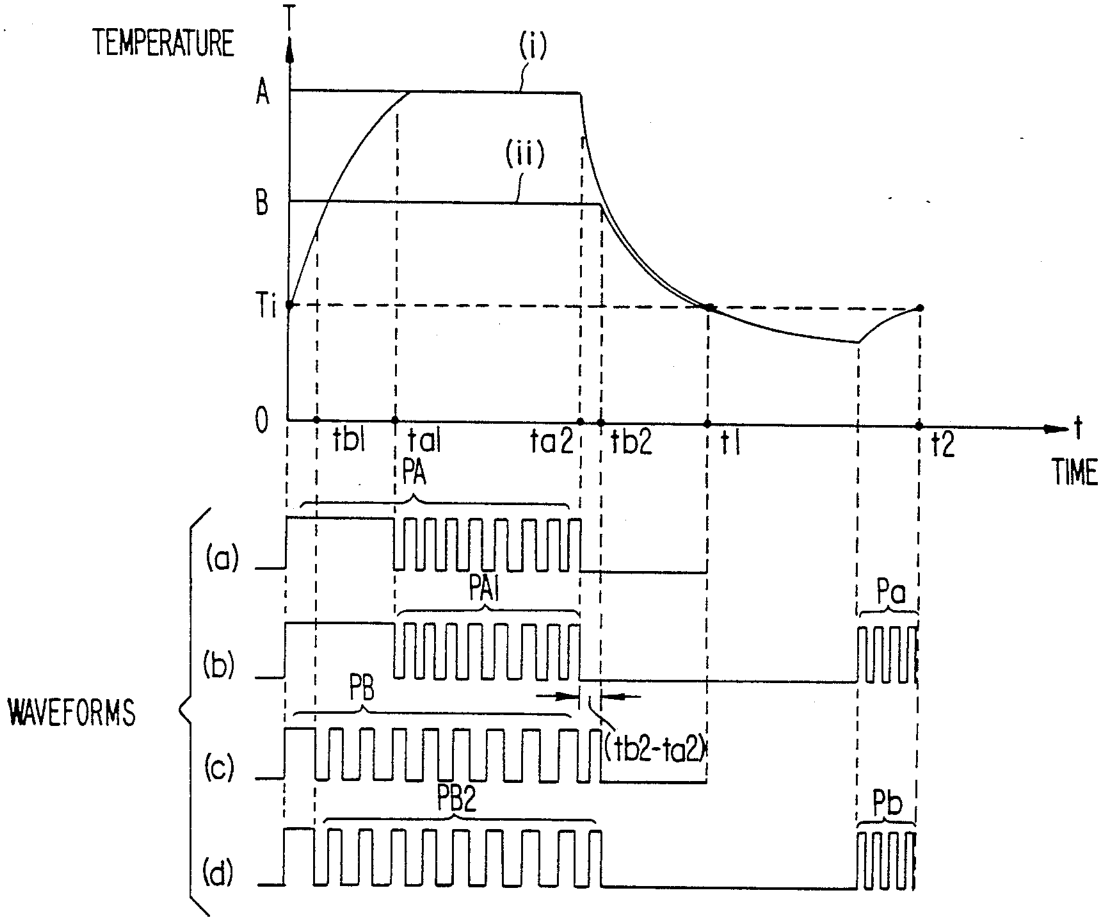
FIGS. 5, 6, 7 and 8 illustrate the temperature characteristics of the heat generating elements according to the heating methods of the invention.
Figure 6:
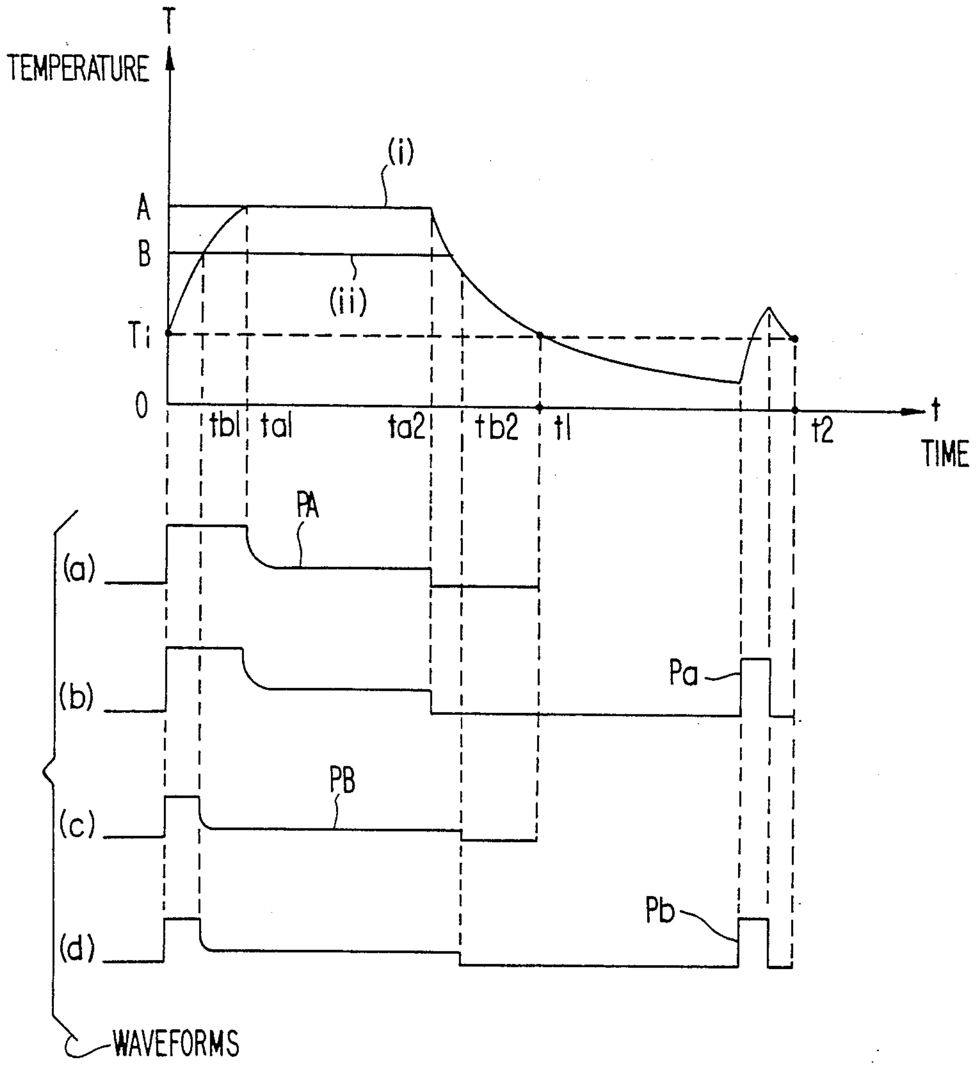

The process of the heating control of the heat generating element shown in FIGS. 5 and 6 is as follows.

(a) The period of heat-rising; (t: $0 \sim t_{a1}$, $0 \sim t_{b1}$ in FIGS. 5 and 6).

The heat generating element is provided the maximum power level.

The driving of the maximum power level is finished at the time corresponding to the tone level.

(b) The period of heat-sustaining; (t: $t_{a1} \sim t_{a2}$, $t_{b1} \sim t_{b2}$ in FIGS. 5 and 6).

The heating element is provided a predetermined power level for sustaining the temperature level that is reached.

(c) The period of not heating; (t: $t_{a2} \sim t_1$, $t_{b2} \sim t_1$ in FIGS. 5 and 6).

The heating power provided to the heat generating element is finished at the time $t_{a2}$ (for characteristic curve (i)), or the time $t_{b2}$ for characteristic curve (ii), and the temperature level reaches the level $T_i$ at the time $t_1$.

(d) In this case the starting point of the supply of the succeeding heating power is delayed until the time $t_2$ (waveforms (b), (d) in FIGS. 5 and 6).

The temperature level is controlled by providing the heating power illustrated by waveforms $P_a$ and $P_b$.

The difference between the control method illustrated with FIG. 5 and that of FIG. 6 is in the waveforms of the driving pulses from the time $t_{a1}$ to the time $t_{a2}$ and from $t_{b1}$ to $t_{b2}$.

In the case of the waveform in FIG. 5, the driving pulse is provided at intervals with a higher level than that of the signal shown in FIG. 6. The former is easier than the direct current power supply illustrated with PA and PB in FIG. 6 because the level of the waveform is constant and the waveform is controlled only by the interval time. We explain the control shown in FIG. 5 as follows.

The temperature characteristic indicated by the curve (i) shown in FIG. 5 which reaches the heating temperature A is controlled by the drive signal indicated by the waveform (a) to set the temperature at the time $t_1$ to $T_i$. Namely, a high level signal is applied continuously to the heat generating element up to the time $t_{a1}$, and thereafter the pulse $PA_1$ (where a high level and a low level appears alternately) is applied up to the time $t_{a2}$ to keep the temperature A and the temperature is returned to $T_i$ at the time $t_1$ through the control. The temperature characteristic indicated by the curve (ii) which reaches the heating temperature B is driven and controlled as indicated below.

As shown in the waveform (c), a high level signal is applied to the heat generating element continuously up to the time $t_{b1}$, and thereafter the pulse PB 2 (where a high level and low level appears alternately) is applied up to the time $t_{b2}$ to keep the temperature B, and the temperature reaches $T_i$ at the time $t_1$ through this control.

Here the control pulse PB2 is applied for a time longer than the time of the control pulse PA1 of waveform (a), by the time difference ($t_{b2} - t_{a2}$) between the times $t_{b2}$ and $t_{a2}$.

If the next recording time is delayed up to the time $t_2$, the temperature at the time $t_2$ is controlled to be $T_i$ by inserting the auxiliary pulses $P_a$, $P_b$ as indicated in the waveforms (b), (d). When the auxiliary pulses $P_a$, $P_b$ where the high and low levels are alternately repeated are used as explained above, the energy of such pulses to be applied can be minimized.

Sone ripples are generated in the corresponding temperature characteristic when a pulse-wire heating signal is applied, but no problem arises with respect to the characteristics of an actual apparatus.

It is a matter of course that the auxiliary signals $P_a$, $P_b$ may be signals with alternating high and low levels, but in such a case, these appear continuously with the printing signal in the next recording period, and the history cannot be cancelled perfectly.

Therefore, these signals can be made to not appear continuously in said signal.

FIG. 6 is an example of modification of the compensating method shown in FIG. 5. In FIG. 6, when a tonal level is high, the heat generating element temperature is set to $T_i$ at the time $t_1$ by heating it with the drive signal PA shown by waveform (a) and, when the next recording start is delayed up to the time $t_2$, the heat generating element temperature is set to $T_i$ at the time $t_2$ by heating it with the period change compensating signal Pa following the drive signal PA as shown in waveform (b). When a tonal level is low, the heat generating element temperature is set to $T_i$ at the time $t_1$ by heating it with the drive signal PB having the waveform as shown in waveform (c), and, when the next recording time is delayed up to the time $t_2$, such temperature can be set to $T_i$ at the time $t_2$ by applying the period change compensating signal Pb following the drive signal PB as shown in waveform (d).

Figure 7:
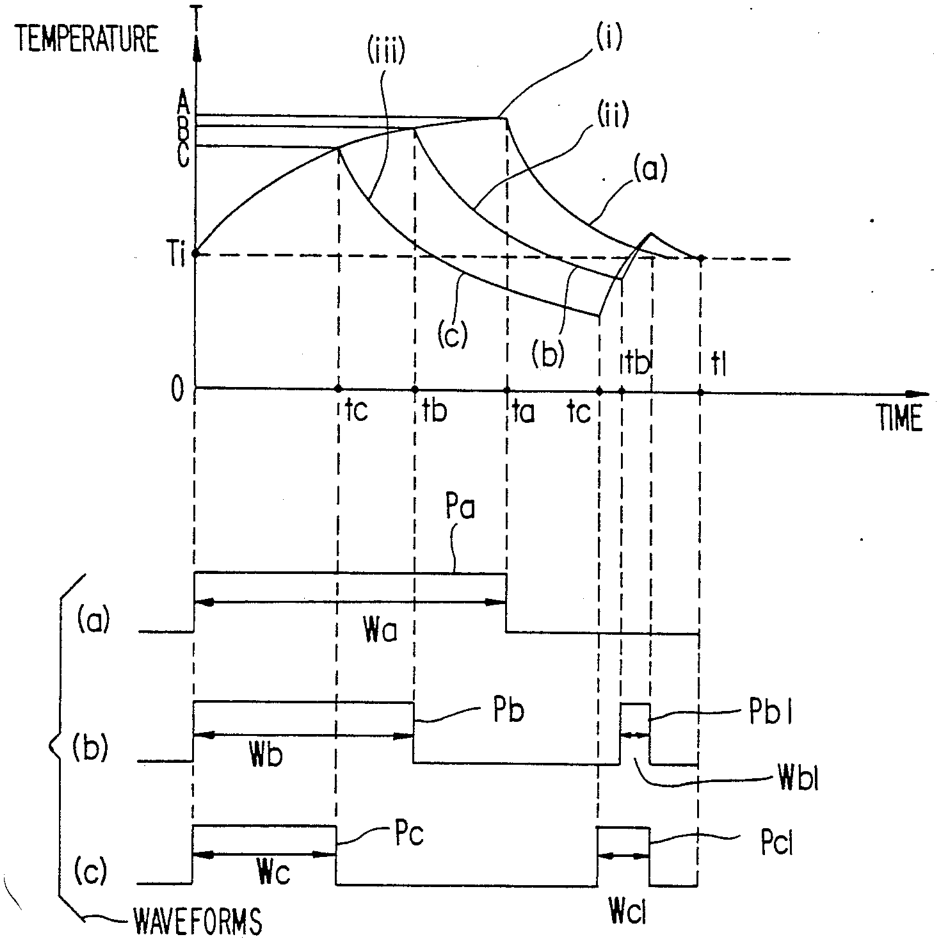

FIG. 7 shows the principle of another control method. Also in this figure, the same parameters are plotted on the horizontal and vertical corrdinates as in the case of FIG. 5.

In FIG. 7, when recording signal $P_a$ having the width $W_a$ as shown in waveform (a) is applied to the heat generating element, the temperature of the heat generating element changes as indicated by (i) and becomes equal to the target temperature $T_i$ at the time $t_1$. When a recording signal $P_b$ having the width $W_b$ as shown in waveform (b) is applied, the temperature of the heat generating element changes as indicated by (ii) and becomes lower than the target temperature $T_i$ at the time $t_1$, and therefore the temperature compensating signal $P_{b1}$ of width $W_{b1}$ is applied at a time $t_b$. Thereby, the temperature of the heat generating element can be set to $T_i$ at the time $t_1$ even when the recording signal $P_b$ is applied. When a recording signal $P_c$ having width $W_c$ shown in waveform (c) is applied, the temperature of the heat generating element can be set to $T_i$ at the time $t_1$ by applying the temperature compensating signal $P_{c1}$ having width $W_{c1}$ at the time $t_c$ as shown in (iii). Here, pulse width of recording signals $P_a$, $P_b$ and $P_c$ is specified by the tonal level of data to be recorded and the temperature compensating signals $P_{b1}$, $P_{c1}$ compensate dispersion of stored heat of the heat generating element due to the change of such tonal level, namely the change of quantity of heat applied to the heat generating element by the recording signal. Accordingly, the temperature compensating signal $P_{b1}$, $P_{c1}$ is called the heating change compensating signal. The pulse width of the heating change compensating signal $P_{b1}$, $P_{c1}$ can be specified by the tonal level.

In this case, the temperature compensating signals $P_{b1}$, $P_{c1}$ are predetermined corresponding to the heat generating temperature B, C. It is understood for the heat generating temperature A that the compensating signal substantially having effectively a pulse width of zero is applied.

The compensating signal having such a profile results in the advantage that the circuit for control can be designed easily.

Figure 8:
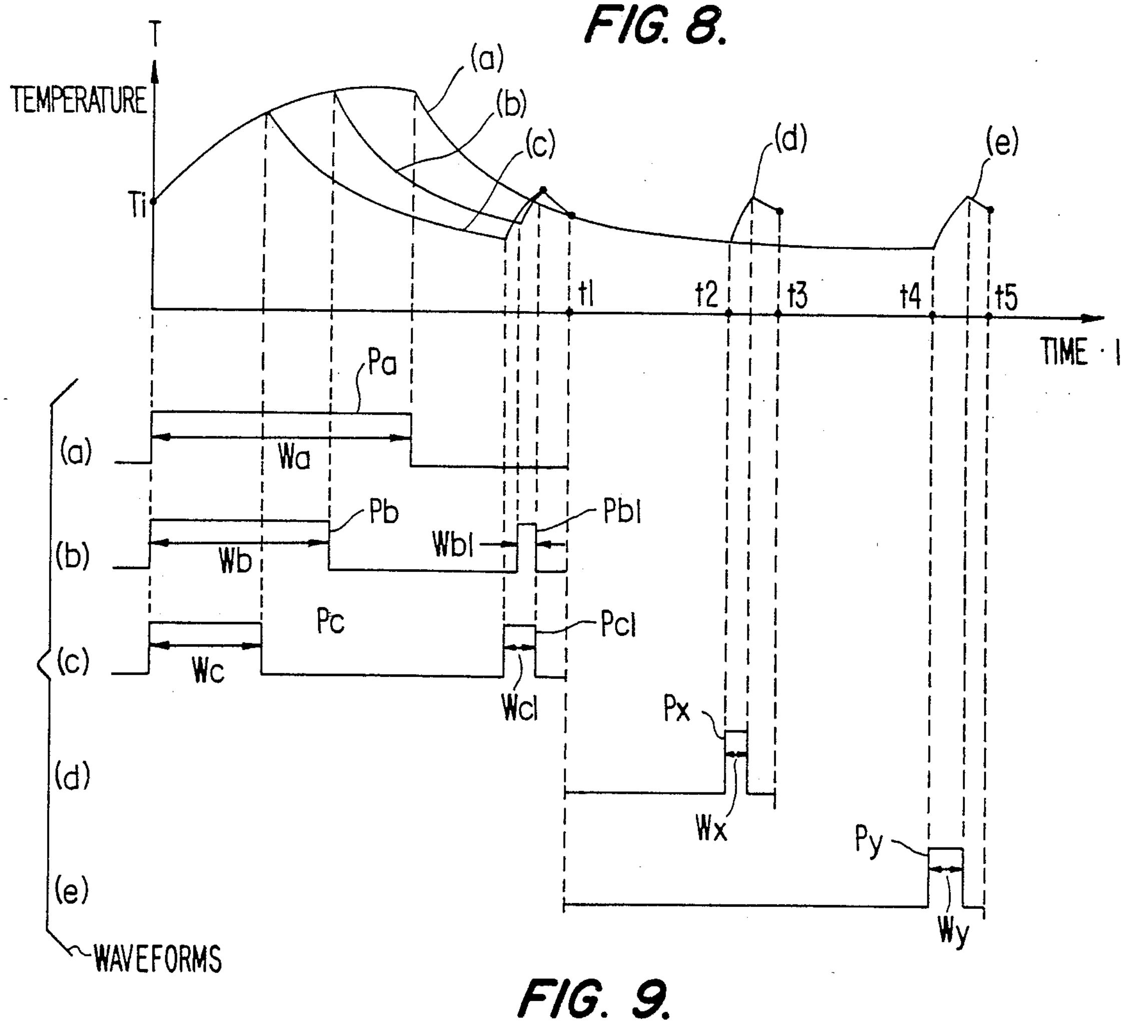

FIG. 8 shows a method of driving by the compensating signal.

As shown in FIG. 8, the next recording is not started at the time $t_1$, and instead it is delayed up to time $t_3$ or $t_5$, at which time the temperature compensating signal $P_x$ or $P_y$ is applied. Namely, when the next start of recording is delayed up to the time $t_3$, the temperature of the heat generating element can be matched to the target temperature $T_i$ at the recording start time $t_3$ by applying the temperature compensating signal $P_x$ of pulse width $W_x$ at the time $t_2$. In the same way, when recording start is delayed up to the time $t_5$, the temperature of the heat generating element can be matched to the target temperature $T_i$ at the recording start time $t_5$ by applying the temperature compensating signal $P_y$ of pulse width $W_y$ at the time $t_4$. The drive signals $P_{b1}$, $P_{c1}$ applied at the time $t_1$ are the same as the heat change compensating signals $P_{b1}$, $P_{c1}$ in FIG. 7.

These temperature compensating signals $P_x$, $P_y$ are used for compensating change of stored heat of the heat generating elements resulting from change of recording period. The pulse of such compensating signals $P_x$, $P_y$ is specified only by the time until the time $t_3$ or $t_5$ for starting the next recording from the time $t_1$ and does not depend on the recording signal.

It is no longer necessary to refer to the past drive conditions, as a result of cancelling any temperature change due to difference of the quantity of heating to heat the generating element and to any temperature change due to change of the recording period within such recording period, and thereby the temperature of the heat generating element at the time of starting the record is matched to that at the time of ending the recording.

Figure 9:
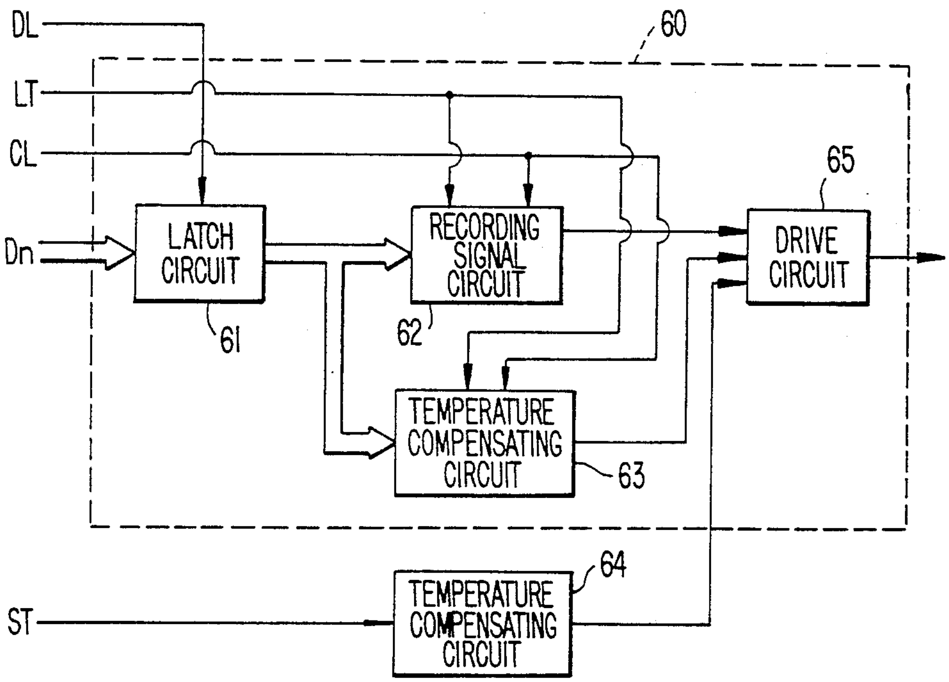
FIGS. 9 and 10 shows a device according to the present invention.
Figure 10:
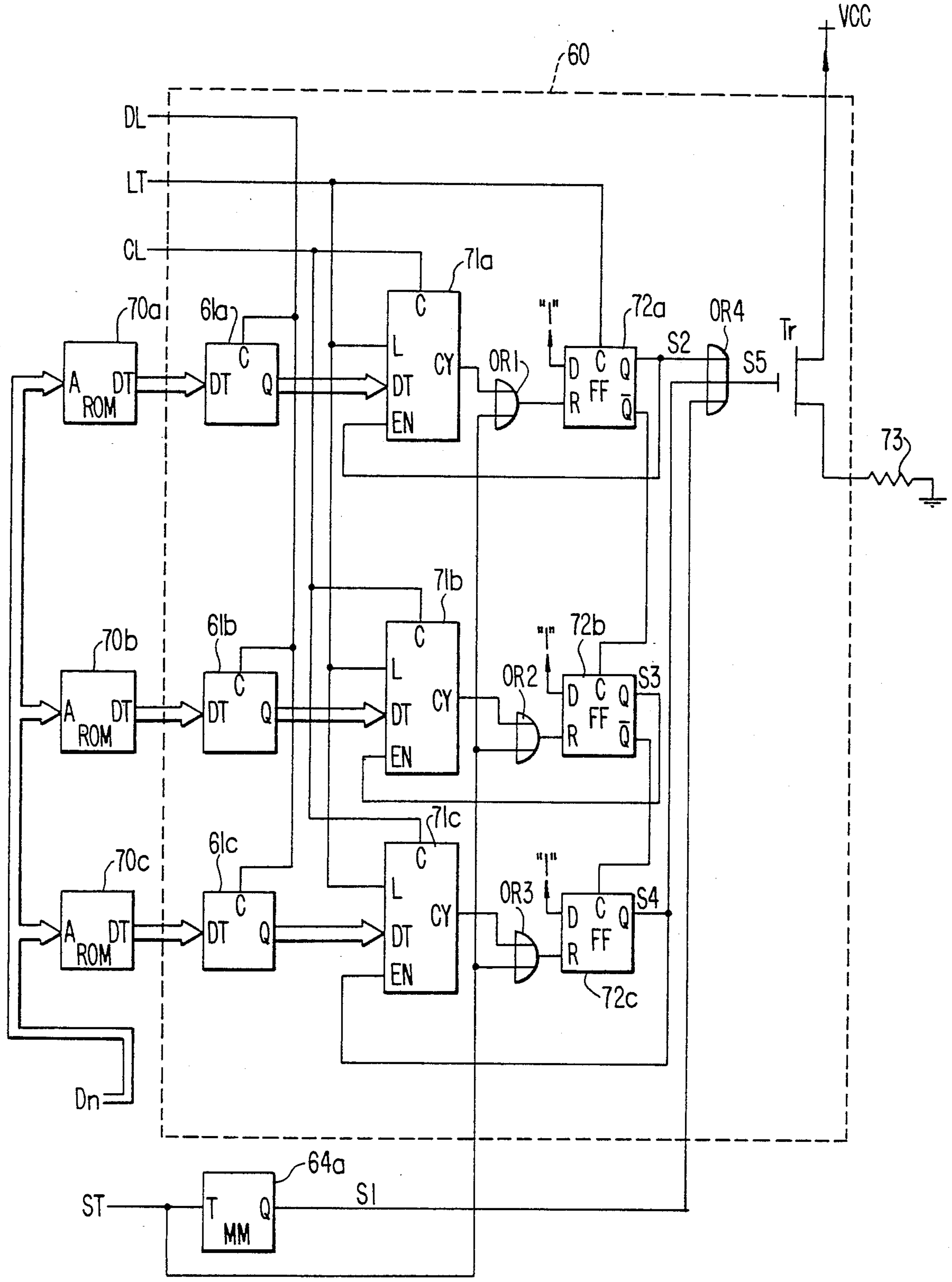
Figure 11:
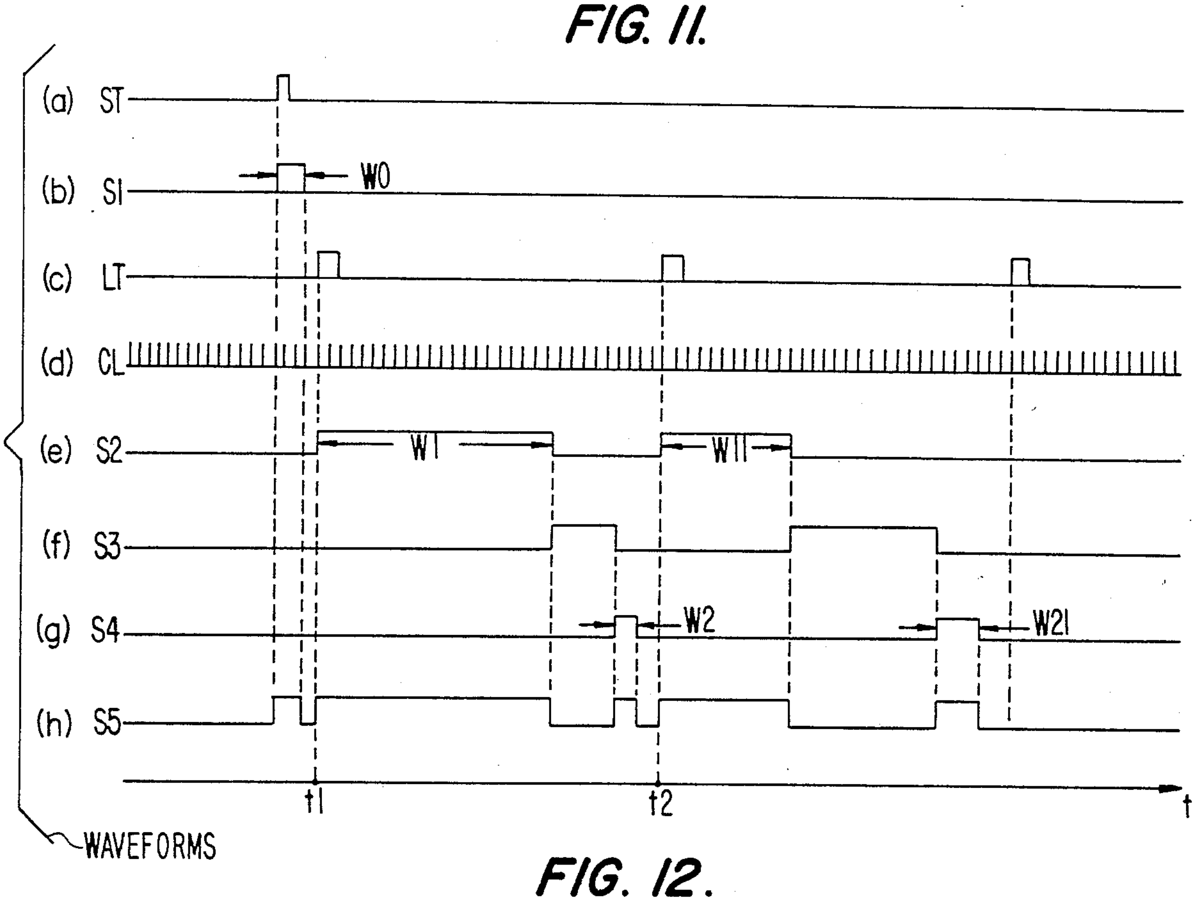
FIG. 11 shows waveforms for the circuit of FIGS. 9 and 10.

FIG. 9, is a block diagram indicating the outline of an apparatus for compensating dispersion of stored heat of the heat generating element resulting from change in the quantity of heating. FIG. 10 is a detailed schematic diagram. FIG. 11 is a time chart indicating respective signal waveforms for the circuit of FIG. 10.

In FIG. 9, 61 is a latch circuit, 62 is a recording signal generating circuit, 63 is a first temperature compensating signal generating circuit, 64 is a second temperature compensating signal generating circuit, and 65 is a heat generating element drive circuit. The data latch signal DL and tonal data $D_n$ are input to the latch circuit 61 and when the data latch signal DL is input, the latch circuit 61 stores the tonal data $D_n$. The line timing signal LT, clock signal CL and output data of latch circuit 61 are input to the recording signal generating circuit 62, and this circuit 62 outputs the recording signal in the pulse width corresponding to the tonal data $D_n$ to the heat generating element drive circuit 65. The line timing signal LT, clock signal CL and output data of latch circuit 61 are also input to the first temperature compensating signal generating circuit 63, and this circuit outputs the heating change compensating signal for compensating dispersion of the stored heat from the heat generating signal, that is, for compensating dispersion of the stored heat of the heat generating element resulting from change in the quantity of heating, to the heat generating element drive circuit 65. To the second temperature compensating signal generating circuit 64, the start signal ST is input when the apparatus is started or when the page is turned and it outputs the start time temperature compensating signal to the heat generating element drive circuit 65. Although not shown, the heat generating element drive circuit 65 is connected to a heat generating elememt of a thermal head. Accordingly the block 60 indicated by the dotted line corresponds to one heat generating element. When the thermal head has 1680 heat generating elements, 1680 blocks 60 are required.

In FIG. 10, various data corresponding to the tonal data $D_n$ are stored in the respective read only memories (hereinafter referred to as ROMs) $70_a$, $70_b$, $70_c$. In the ROM $70_a$, pulse width data of the recording signal is stored, while in the ROM $70_b$, the time until starting application of the heating change compensating signal from the end of heating by the recording signal is stored, and in the ROM $70_c$, pulse width data of heating change compensating signal is stored.

The latch circuits $61_a$, $61_b$ and $61_c$ respectively store outputs of ROMs $70_a$, $70_b$, and $70_c$ when the data latch signal DL is input. The counters $71_a$, $71_b$, $71_c$ have as inputs the output data of latch circuits $61_a$, $61_b$, $61_c$ at the terminals DT when the line timing signal LT is input to the terminal L, and each subtracts the value read for each input of the clock signal CL. When subtraction of the value read is completed, the counters $71_a$, $71_b$, $71_c$ output the carry signal from the terminal CY to the corresponding OR gares OR1, OR2 and OR3. The outputs of the OR gates OR1, OR2, OR3 are input to the terminals R of the flip-flop circuits (hereinafter referred to as FF) $72_a$, $72_b$, $72_c$. The line timing signal LT is input to the terminal C of FF $72_a$ and, when the signal is input to the terminal R, the terminal Q becomes "1" while the terminal $\overline{Q}$ becomes "0". The output terminal $\overline{Q}$ of FF $72_a$ is connected to the terminal C of FF $72_b$ and a signal is input to the terminal R. Thereby the terminal $\overline{Q}$ of FF $72_b$ becomes "1" and the terminal Q becomes "0". The output terminal $\overline{Q}$ of FF $72_c$ is connected to the terminal C of FF $72_c$ and, when a signal is input to the terminal R of FF $72_b$, the terminal $\overline{Q}$ becomes "1" and the terminal Q becomes "0".

The OR gate OR4 is connected with the terminal Q of FF $72_c$. Moreover, the OR gate OR4 is connected with the output of the monostable multivibrator circuit 64a (hereinafter referred to as MM) which forms the second temperature compensating signal generating circuit 64. The MM $64_a$ outputs the start time temperature compensating signal $S_1$ having the specified pulse width for each input of the start signal ST. The output of the OR gate OR4 is connected to the gate terminal of transistor Tr. The source terminal of transistor Tr is grounded through a heat generating element 73 of a thermal head, and its drain terminal is connected to the power source $V_{cc}$.

Next, operation of the circuit shown in FIG. 10 is explained by referring to the waveforms of FIG. 11. When the start signal ST or waveform (a) is input, MM 64a outputs the start time temperature compensating signal $S_1$ of waveform (b) which becomes "1" only for the constant predetermined time for which the output is constant. Meanwhile, the start signal ST is input to FF $72_a$, $72_b$, $72_c$ through the OR gates OR1, OR2, OR3, thus resetting each FF. The start time temperature compensating signal $S_1$ having the pulse width $W_0$ drives the transistor Tr through the OR gate OR4 and heats the heat generating element 73. The pulse width $W_0$ is set so that the desired heating due to the start time temperature compensating signal $S_1$ is completed, and the temperature of the heat generating element 73 at the recording start time $t_1$ is thus set to $T_i$.

When the line timing signal LT of waveform (c) is input, output data of latch circuits $61_a$, $61_b$, $61_c$ are set, on one hand, to the counters $71_a$, $71_b$, $71_c$. On the other hand, FF $72_a$ changes its state by the input of the line timing signal LT, and the output of terminal Q becomes "1". Accordingly, since the terminal EN of counter $71_a$ becomes "1", the counter $71_a$ starts subtraction in accordance with the clock signal CL. However, since the terminals EN of counters $71_b$, $71_c$ are set to "0", the counting operation does not start for these. When a counted value of counter $71_a$ becomes "0" and the carry signal is output from the counter, FF $72_a$ is inverted and its terminal Q becomes "0". The signal $S_2$ of waveform (e) sent from the FF $72_a$ is a recording signal of pulse width $W_1$ corresponding to the tonal data $D_n$. When the heat generating element 73 is driven by such signal, the ink of the ink sheet melts and is transferred to the recording paper for recording.

When the FF $72_a$ is inverted, the terminal EN of counter $71_b$ becomes "1" and therefore the counter $71_b$ starts subtraction of the values being set.

When the counted value of counter $71_b$ become "0", FF $72_b$ is inverted and therefore the terminal C of FF $72_c$ becomes "1". Accordingly, the output terminal Q becomes "1" and the counter $71_c$ starts subtraction.

When the counted value of counter $71_c$ becomes "0", FF $72_c$ is inverted and output terminal Q becomes "0". Namely, an output $S_4$ of FF $72_c$ as in waveform (g) is supplied as the heating change compensating signal, which becomes "1" only as a result of the subtracting operation of counter $71_c$. Its pulse width $W_2$ is specified by the pulse width $W_1$ of the recording signal $S_2$, in other words, the specified tonal data $D_n$. The heating change compensating signal $S_4$ drives the transistor Tr through the OR gate OR4 and heats the heat generating element 73. At the time $t_2$ when the next line timing signal LT is input by such heating change compensation signal $S_4$, the temperature of the heat generating element is set to the target temperature $T_i$ by compensation.

When the next line timing signal LT is input at the time $t_2$, and a level of tonal data $D_n$ indicated at this time is lower than the immediately preceeding level of recorded tonal data, the pulse width of the recording signal $S_2$ which is output by FF $72_a$ becomes $W_{11}$ which is shorter than $W_1$. Therefore, the temperature of the heat generating element 73 is low and the pulse width $W_{21}$ of the heating change compensating signal $S_4$ is set wider than $W_2$ to match the target temperature $T_i$. The heating change compensating signal $S_4$ having the pulse width $W_2 < W_{21}$ compensates for the change of pulse width of the recording signal applied to the heat generating element 73, in other words for the dispersion of stored heat of the heat generating element resulting from change of the quantity in heating by the heat generating element, and thereby sets the temperature of the heat generating element at the recording start time of each recording period to the constant target temperature $T_i$.

In case the line timing signal LT appears with a constant interval, in other words, for the case where the recording period does not change as shown in waveform (c) of FIG. 11, the temperature of the heat generating element at the time of starting the recording can be sustained at the target temperature $T_i$ by cancelling the dispersion of stored heat of the heat generating element resulting from change of the quantity of heating of the heating element by the heating change compensating signal $S_4$. However, the temperature of the heat generating element cannot be sustained at the constant target temperature $T_i$ at the time of starting the recording only by such heating change compensating signal for the apparatus where the recording period changes.

Figure 12:
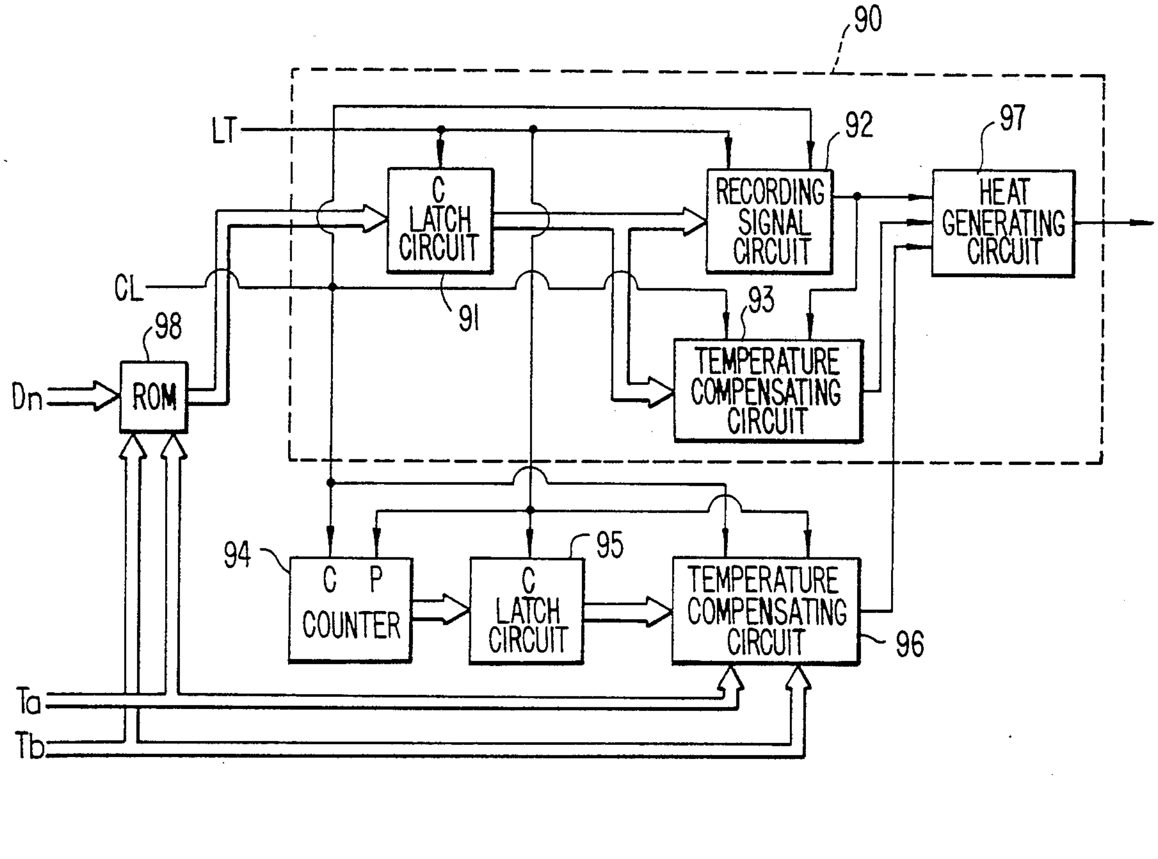
FIGS. 12 and 13 indicate circuits for compensating dispersion of stored heat when the recording period is changed and FIG. 14 shows respective waveforms.
Figure 13:
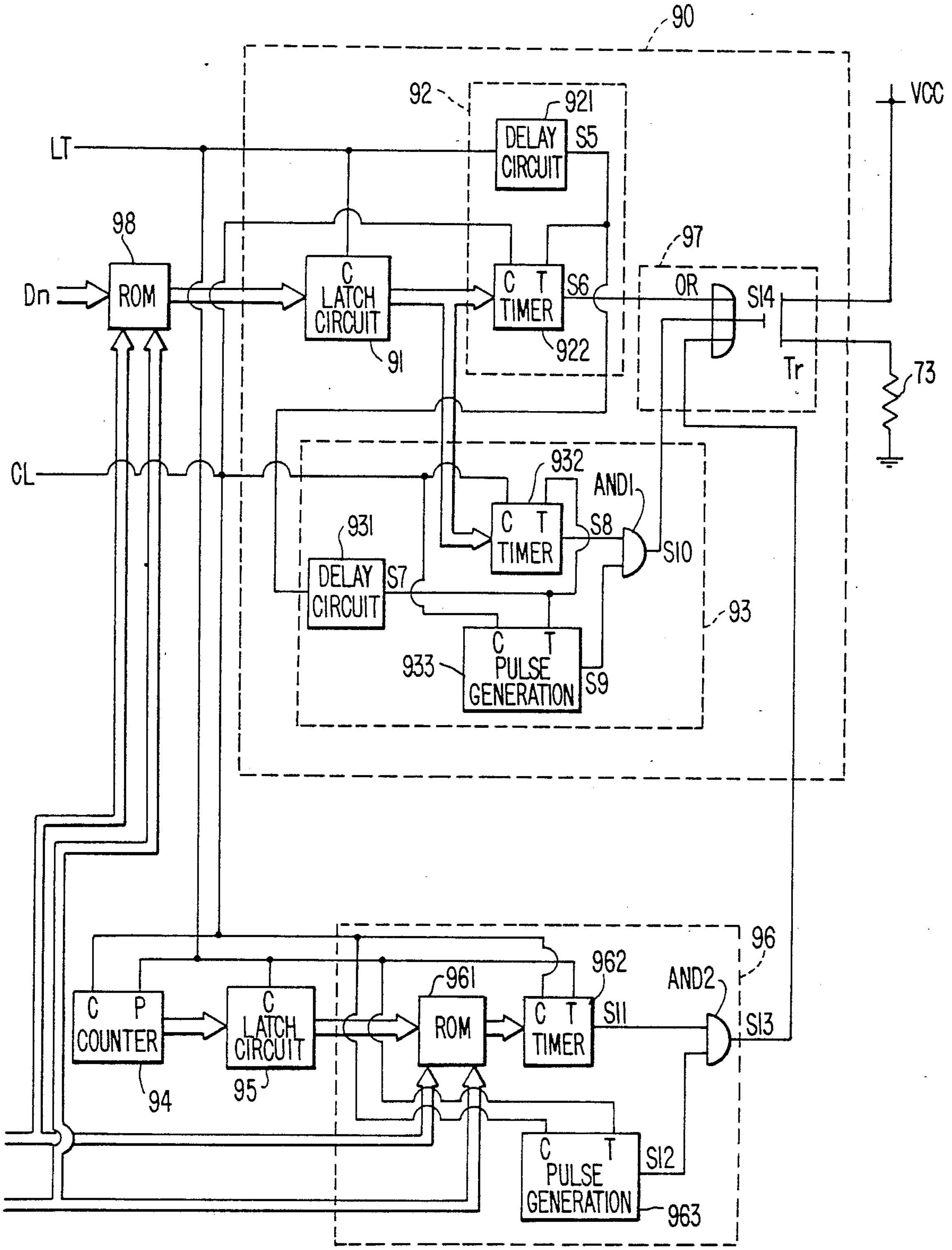
Figure 14:
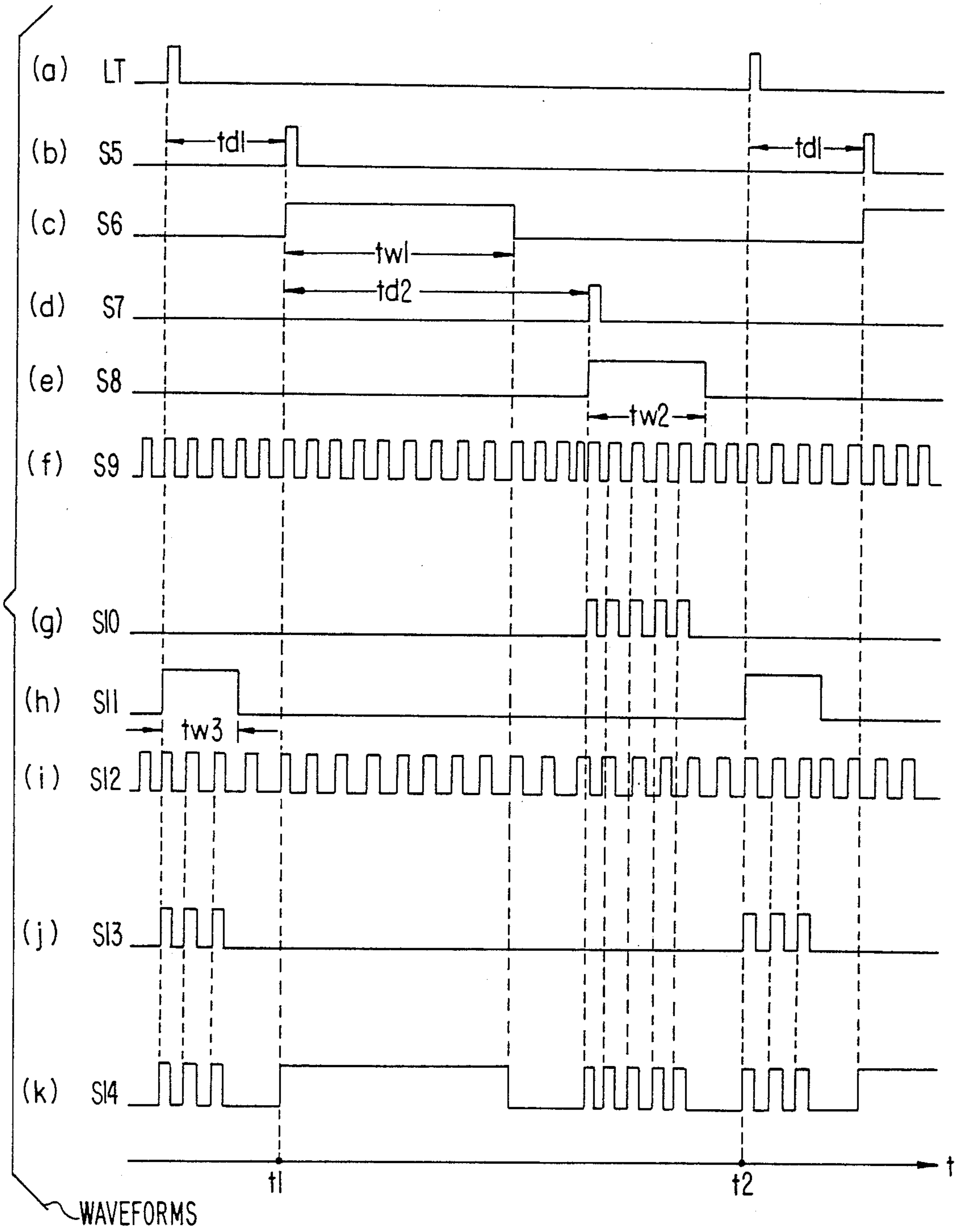

FIG. 12 to FIG. 14 are examples of a circuit for compensating dispersion of stored heat of the heat generating element resulting from change in the quantity of heating and for dispersion of stored heat of the heat generating element resulting from change of the recording period. In this embodiment, the effect of change of ambient temperature of the ink sheet and of ambient temperature of the heat generating element can also be compensated.

In FIG. 12, 91 is a latch circuit, 92 is a recording signal generating circuit, 93 is a first temperature compensating signal generating circuit, 94 is a counter, 95 is a latch circuit, 96 is a second temperature compensating signal generating circuit, 97 is a heat generating element drive circuit, and 98 is a read only memory (hereinafter referred to as a ROM).

To the ROM 98, the tonal data $D_n$ of data to be recorded, ink sheet ambient temperature $T_a$ and heat generating element ambient temperature $T_b$ are input. Meanwhile, the ink sheet ambient temperature $T_a$ and the heat generating element ambient temperature $T_b$ are simultaneously input to the second temperature compensating signal generating circuit 96. ROM 98 stores the tonal data $D_n$, pulse width $t_{w1}$ of the recording signal corresponding to the ambient temperature $T_a$, $T_b$, and pulse width $t_{w2}$ of the heating change compensating signal, and an output consisting of a plurality of bits is connected to the latch circuit 91. When the line timing signal LT is input, said latch circuit 91 stores such input signal. The pulse width $t_{w1}$ which is one output of the latch circuit 91 is input to the recording signal generating circuit 92, while the pulse width $t_{w2}$ which is the other output is input to the first temperature compensating signal generating circuit 93.

The recording signal generating circuit 92, to which the line timing signal LT and clock signal CL are input, outputs the recording signal to the heat generating element drive circuit 97. The first temperature compensating signal generating circuit 93 outputs the heating change compensating signal, namely, the signal for compensating dispersion of stored heat resulting from change of quantity of heating for the heat generating element to the heat generating element drive circuit 97. The counter 94, to which the line timing signal LT and clock signal CL are input, clears a counted value for each input of such line timing signal LT and carries out addition depending on the clock signal CL from the initial value. Therefore, the counted value corresponds to the time interval of the line timing signal LT. When the line timing signal LT is input, the latch circuit 95 stores a counted value of counter 94 and outputs it to the second temperature compensating signal generating circuit 96. The second temperature compensating signal generating circuit 96 outputs the period change compensating signal which is generated when the recording period is delayed for more than the constant time interval by the data sent from the latch circuit 95 to the heat generating element drive circuit 97. This circuit 97 applies the drive signal to the heat generating element of the thermal head for heating it. The block 90 corresponds to a heat generating element and therefore, when the thermal head has 1680 heat generating elements, 1680 blocks 90 are required.

FIG. 13 shows a detailed schematic diagram of FIG. 12. The recording signal generating circuit 92 in FIG.

12 is composed of a delay circuit 921 and a timer 922, an output of latch circuit 91 is connected to said timer 922 and an output of said timer 922 is connected to the heat generating element drive circuit 97. The first temperature compensating signal generating circuit 93 is composed of a delay circuit 931, a timer 932, a pulse generator 933 and an AND gate AND1, an output of the latch circuit 91 is connected to the timer 932, and an output of the AND gate AND1 is connected to the heat generating element drive circuit 97. The second temperature compensating signal generating circuit 96 is composed of a ROM 961, a timer 962, a pulse generator 963 and an AND gate AND2. The output of latch circuit 95, the ink sheet ambient temperature $T_a$, and the heat generating element ambient temperature $T_b$ are supplied to the ROM 961. The ROM 961 stores a pulse width $t_{w3}$ of the period change compensating signal and the value of the pulse width $t_{w3}$ is changed depending on the output value of latch circuit 95 and the values of the ambient temperatures $T_a$, $T_b$. The output of the AND gate AND2 is connected to the heat generating element drive circuit 97. The heat generating element drive circuit 97 is composed of the OR gate OR and transistor Tr, and an output of the recording signal generating circuit 92, the output of the first temperature compensating signal generating circuit 92, and the output of the second temperature compensating signal generating circuit 96 are connected to the gate of transistor Tr through the OR gate OR. The drain of the transistor Tr is connected to the power source Vcc and the source is grounded through the heating generating element 73 of the thermal head.

Operation of the circuit shown in FIG. 13 is explained by referring to the waveforms of FIG. 14.

When the line timing signal LT appears, as for example in waveform (a), the delay circuit 921 is started and the latch circuit 91 stores the pulse widths $t_{w1}$, $t_{w2}$ sent from the ROM 98. Simultaneously, since the line timing signal LT is input to the counter 97, latch circuit 95 and pulse generator 963, a counted value of counter 94 is cleared and addition from the initial value is started. The latch circuit 95 stores a counted value of counter 94 before it is cleared and then sends it to the ROM 961. The phase of the pulse generator 963 is initialized by the line timing signal LT. The ROM 961 sets a pulse width $t_{w3}$ specified by the value sent from the latch circuit 95 and the values of ambient temperature $T_a$, $T_b$ to the timer 962. The output $S_{11}$ of timer 962 becomes "1" until the number of clock signals CL becomes equal to the pulse width $t_{w3}$ according to the timing to which the pulse width $t_{w3}$ is set. Therefore, the output $S_{12}$ from the pulse generator 963 is gated by the output $S_{11}$ in the AND gate AND 2 and is then output to the OR gate OR of the heat generating element drive circuit 97 as the signal $S_{13}$. This pulse-width modulated period change compensating signal $S_{13}$ drives the transistor Tr, heats the heat generating element 73, and sets the temperature to the target temperature $T_i$ at the time $t_1$.

After the delay time $t_{d1}$ from the start of the line timing signal LT, output $S_5$ of the delay circuit 921 becomes "1" as in waveform (b), the timer 922 starts counting the clock signal CL, and meanwhile the delay circuit 931 is started. When the counting of clock signal CL is started at the time 922, an output $S_6$ as in waveform (c) becomes "1", and, when a number of clocks counted corresponds to the pulse width $t_{w1}$ sent from the latch circuit 91, the output becomes "0". This output $S_6$ is a recorded signal, which drives the transistor Tr through the OR gate OR and heats the heat generating element 73. When heated, the ink sheet melts and is transferred to the recording paper for recording.

After the specified delay time $t_{d2}$, the delay circuit 931 sets the outputs $S_7$ to "1" as in waveform (d). The timer 932 is triggered by this signal $S_7$, and the counting of the clock signal CL is started and simultaneously the phase of the pulse generator 933 is initialized. When the timer 932 starts the counting, its output $S_8$ become "1", and, when the number of counted clocks corresponds to the pulse width $t_{w2}$ sent from the latch circuit 91, the output becomes "0". This output $S_8$ as in waveform (e) gates the output to the pulse generator 933 at the AND gate AND1, and the AND gate AND1 sends the pulse-width modulated signal $S_{10}$ of waveform (g) to the OR gate OR. This signal $S_{10}$ is the heating change compensating signal which heats the heat generating element 73 following the recording signal, in order to heat the temperature of heat generating element to the target temperature $T_i$ at the time $t_2$.

As explained above, dispersion of stored heat resulting from change of the recording signal $S_6$ to be applied to the heat generating element 73 is compensated by the heating change compensating signal $S_{10}$ so that the temperature of the heat generating element is set to the target temperature $T_i$ at the time $t_2$. Meanwhile, dispersion of the stored heat of the heat generating element resulting from change of the recording period is compensated by the period change compensating signal $S_{13}$ of waveform (j), and thereby the temperature of the heat generating element at the time $t_1$ can be set to the target temperature $T_i$.

Figure 15:
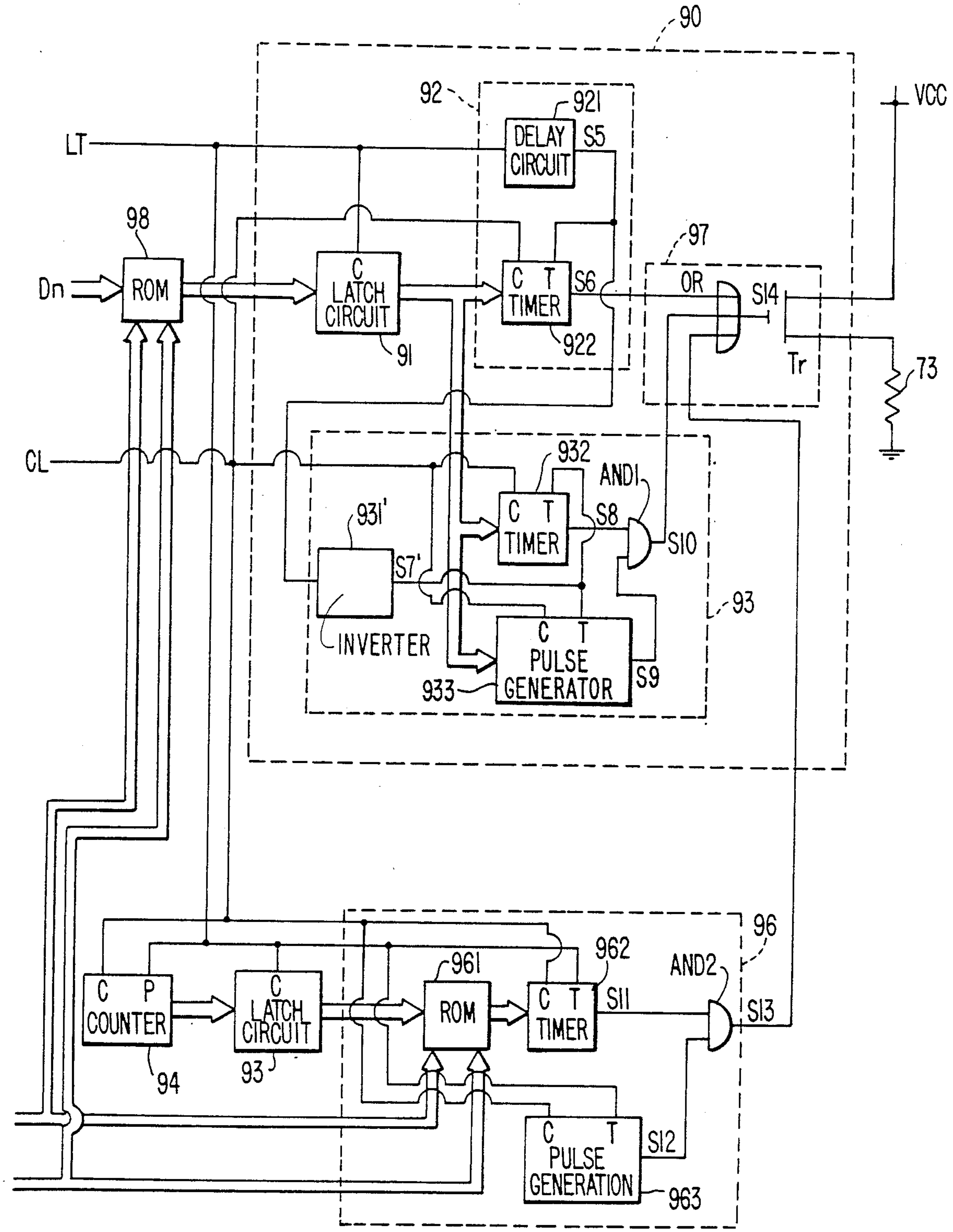
FIG. 15 shows another embodiment of the present invention.
Figure 16:
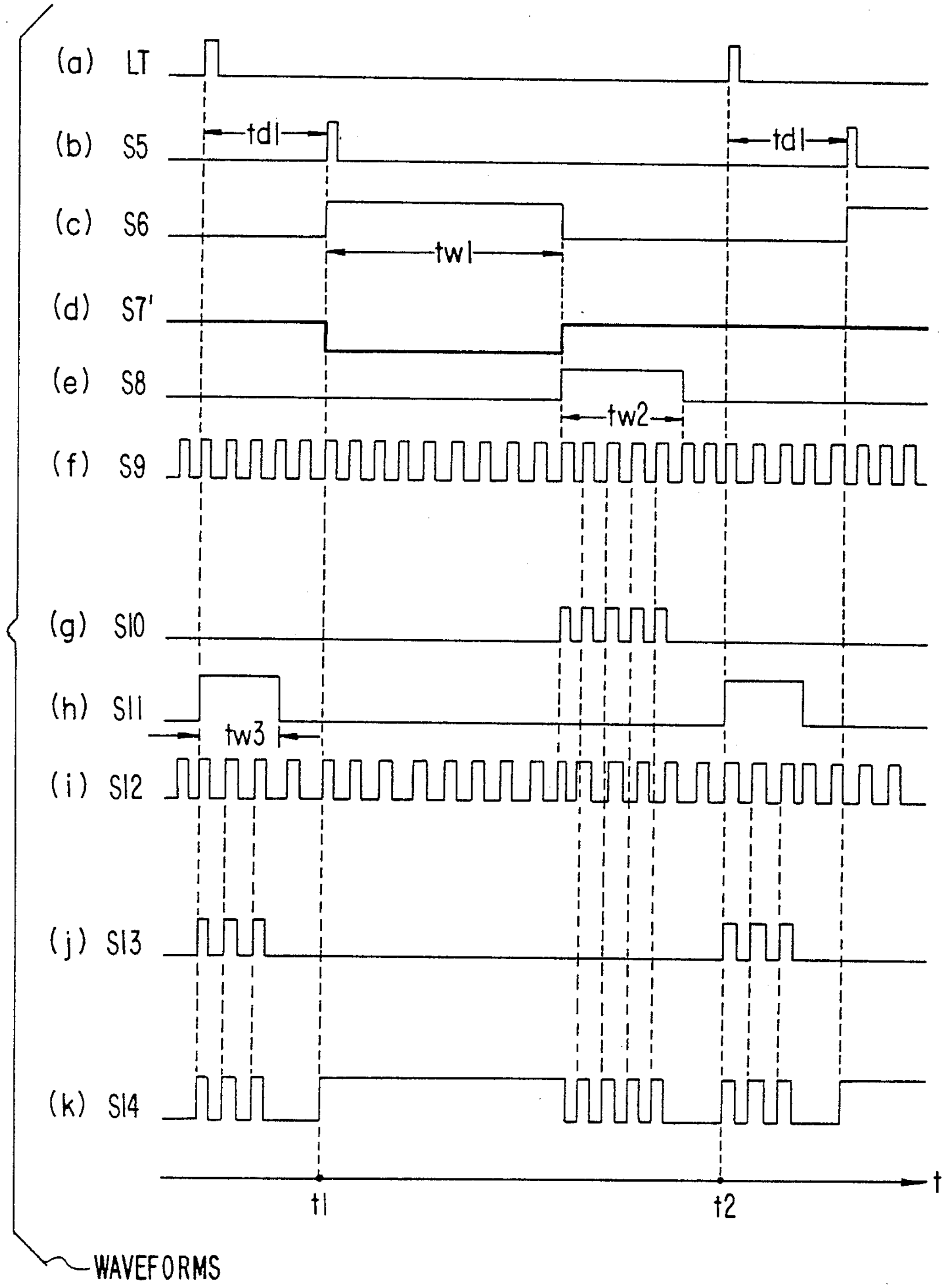
FIG. 16 shows the waveforms thereof.

FIG. 15 shows a circuit for obtaining the control characteristics as shown in FIG. 5, and FIG. 16 shows the waveforms thereof.

Since the constitution is almost the same as in FIG. 13, only the differences from the circuit in FIG. 13 are explained hereinafter.

With respect to FIG. 15, a delay circuit 931 as in FIG. 13 which gives the delay $t_{d2}$ is unnecessary and an inverter 931' is provided in its place. Thereby, when the timer 922 falls after $t_{W1}$ from the rising of $S_5$, and output $S_7'$ of the inverter 931' rises and the pulse generator 933 and timer 932 are triggered. The duty ratio of the pulse generator 933 is written into the ROM 98, which is controlled through the latch 91. Other operations are the same as in FIG. 13.

Regarding FIG. 16, because of replacement of the delay circuit 931 with the inverter 931', the output $S_7$ is changed to $S_7'$ of waveform (d) and thereby $t_{d2}$ becomes equal to $t_{w1}$.

Other operations are the same as those for the waveforms shown in FIG. 14.

Here, the values to be stored in ROM $70_a$, ROM $70_c$ in FIG. 10 and in the ROM 98, ROM 961 in FIG. 13 are described.

The time—temperature characteristic of the heat generating element can be approximated by the following equations where:

- t is the time (t=0 when the drive signal is applied);
- T(t) is the temperature of the heat generating element at time t;
- $T_c$ is the ambient temperature (ambient temperature $T_b$ is the in the example of FIG. 13);
- $\tau$ is the thermal time constant of heat generating element;
- $t_w$ is the pulse width of drive signal;
- W is the applied electrical power; and R is the thermal resistance.

(a) When $t_w \leqq \tau$; (1)

if $0 \leqq t \leqq t_w$, $$T(t) = \frac{WR}{\sqrt{2\tau}} \sqrt{t} + T_c$$

if $t_w \leqq t \leqq \tau$, $$T(t) = \frac{WR}{\sqrt{2\tau}} (\sqrt{t} - \sqrt{t - t_w}) + T_c$$

if $\tau \leqq t \leqq \tau + t_w$, $$T(t) = WR\left(1 - \frac{8}{\pi^2} e^{-t/\tau} - \frac{1}{\sqrt{2\tau}} \sqrt{t - t_w}\right) + T_c$$

if $t \geqq \tau + t_w$, $$T(t) = WR\frac{8}{\pi^2} (e^{-(t-tw)/\tau} - e^{-t/\tau}) + T_c$$

(b) When $t_w \geqq \tau$; (2)

if $0 \leqq t \leqq \tau$, $$T(t) = WR\sqrt{\frac{t}{2\tau}} + T_c$$

if $\tau \leqq t \leqq t_w$, $$T(t) = WR\left(1 - \frac{8}{\pi^2} e^{-t/\tau}\right) + T_c$$

if $t_w \leqq t \leqq t_w + \tau$, $$T(t) = WR\left(1 - \frac{8}{\pi^2} e^{-t/\tau} - \sqrt{\frac{t - t_w}{2\tau}}\right) + T_c$$

if $t \geqq t_w + \tau$, $$T(t) = WR\frac{8}{\pi^2} (e^{-(t-tw)/\tau} - e^{-t/\tau}) + T_c$$

References:

(1) Takano, Matsunaga; "Optimum design of thermal recording head (Communication Lab.)", thesis in Transaction of Telecommunication Circle, J60-D, 2, 1977.

(2) K. E. Mortenson: "Transistor Junction Temperature as a Function of Time", Proc. IRE, 45 page 504, 1975, 4.

(3) D. P. Kennedy: "Spreading Resistance in Cylindrical Semiconductor Devices", J. Appl. Phys., 31, 8, page 1490, 1960.

(4) Tokunaga, Matsunaga, Sugiyama: "Resolution Characteristic of Thermal Transfer Recording", Search material for Telecommunication Circle, EMC 76-49.

The relation between temperature of heat generating element and recording density can be expressed by the following equation, wherein $T_d$ is the ambient temperature (ambient temperature $T_a$ of ink sheet in the example of FIG. 12);

$D_0$ is the saturation density;

$C_i$ is the transfer constant of the ink;

Q is the barrier potential of ink transfer;

K is Boltzman's constant; and

Ch is the constant for thermal conduction from the heat generating element to ink the sheet.

The recording density $D_c$ is expressed as follows:

$$D_c = D_o\left(1 - \exp\left[- \int_0^{t_w} C_i \exp\left(- \frac{Q}{KCh\,(T - T_d) + T_d}\right) dt\right]\right) \quad (3)$$

Therefore, the values to be stored in ROM $70_a$, ROM $70_c$ in FIG. 10 or ROM 98, ROM 961 in FIG. 13 can be determined by the above equation and stored previously.

Then, the target temperature $T_i$ is investigated. In the case of compensating dispersion of stored heat resulting from change of quantity of heating by the heating change compensating signal, the temperature of the heat generating element can be raised but cannot be lowered by application of said heating change compensating signal. Accordingly, the target temperature $T_i$ of the heat generating element at the time t is set to a value which is equal to the temperature $T_t$ of the heat generating element at the time t, or is higher than $T_t$ when the drive signal corresponding to the maximum tonal level is applied and the temperature compensation is not carried out. In the latter case $T_i = T_t$, and therefore, when recording is carried out by applying the drive signal corresponding to the maximum tonal level, heating by the heating change compensating signal is not carried out.

This is also true of the case where dispersion of stored heat resulting from change of recording period is compensated by the period change compensating signal, and the target temperature $T_i$ is set to the temperature which is equal to the temperature $T_t$ of the heat generating element at the time t, or higher than $T_t$ when the drive signal corresponding to the maximum tonal level is applied and temperature compensation is not carried out. In this case $T_i = T_t$, and therefore temperature compensation by the period change compensating signal is not carried out for the minimum recording period.

In the above explanation, it is assumed for the cancelling of the change of the quantity of heating and of the recording period that the temperature of the heat generating element at a certain time is set to the constant value $T_i$ without relation to the quantity of heating and the recording period. The reason for this is explained below.

When $t > \tau + t_w$, from the equations (1) and (2), the heat generating element temperature T can be expressed as indicated below for arbitrary values of the quantity of heating and recording period.

$$T - t_c \alpha e^{-(t-tw)/} - e^{-t/\tau} = e^{-t/\tau}(e^{tw} - 1)\alpha e^{-t/\tau} \quad (4)$$

In case recording is carried out with arbitrary values for quantity of heating and recording period, it is required to supplement the equation (4) by the giving the amplitude of the heating and the time with respect to each recording.

With $C_1$, $C_2$, $t_1$, $t_2$ considered as arbitrary constants, since $$C_1e^{-(t-t1)/\tau}+C_2e^{-(t-t2)/\tau}=e^{-t/\tau}(C_1e^{t1/\tau}+C_2e^{t2/\tau})\alpha e^{-t/\tau} \quad (5)$$

accordingly when recording is conducted with arbitrary quantities of the heating and of the recording period, the difference between the heat generating element temperature T and room temperature $T_c$ is lowered proportionally to $e^{t/\tau}$ for $t \geqq \tau + t_w$. Accordingly, when the heat generating element temperature at a certain time $t_i$ is set to a constant value $T_i$, the heat generating element temperature T at a successive time t can be expressed as indicated below.

$$T(t)-T_c=(T_i-T_c)e^{-(t-ti)/\tau} \quad (6)$$

Therefore, it is seen that histories concerning the heating and the recording period are all cancelled.

Here, it should be noted that the above theory cannot be applied to $t \leqq \tau + t_w$. Namely, for evaluation of the heat generating element temperature $T_i$ at a certain time $t_i$, when the drive signal applied finally rises before the time $t_i-\tau$, it is no longer necessary to consider the conditions such as quantity of heating and recording period, etc. in the past. However, when the drive signal finally applied rises after the time $t_i-\tau$, $T_i$ must be set so that the total error in the quantity of heating is minimized, taking into account the quantity of heating and recording period, for the period until the time passes from the rising of the driving signal that is applied finally.

In the constitution of the present invention explained above, the temperature compensating pulse corresponding to the heating temperature is predetermined by a program.

Such a constitution is employed because it is difficult to directly detect temperature of an individual heat generating element of a thermal head by a sensor. With such a constitution, perfect temperature control can be basically realized. However, measures for the effect of heat generation of the heat generating element itself on the thermal head, and the effect of ambient temperature change, must be considered.

In order to eliminate such effects, the constitution where a temperature sensor is additionally provided in the vicinity of the thermal head for providing control by detection of the temperature change is explained hereunder.

The explanations below relate to control of the recording period.

Figure 17:
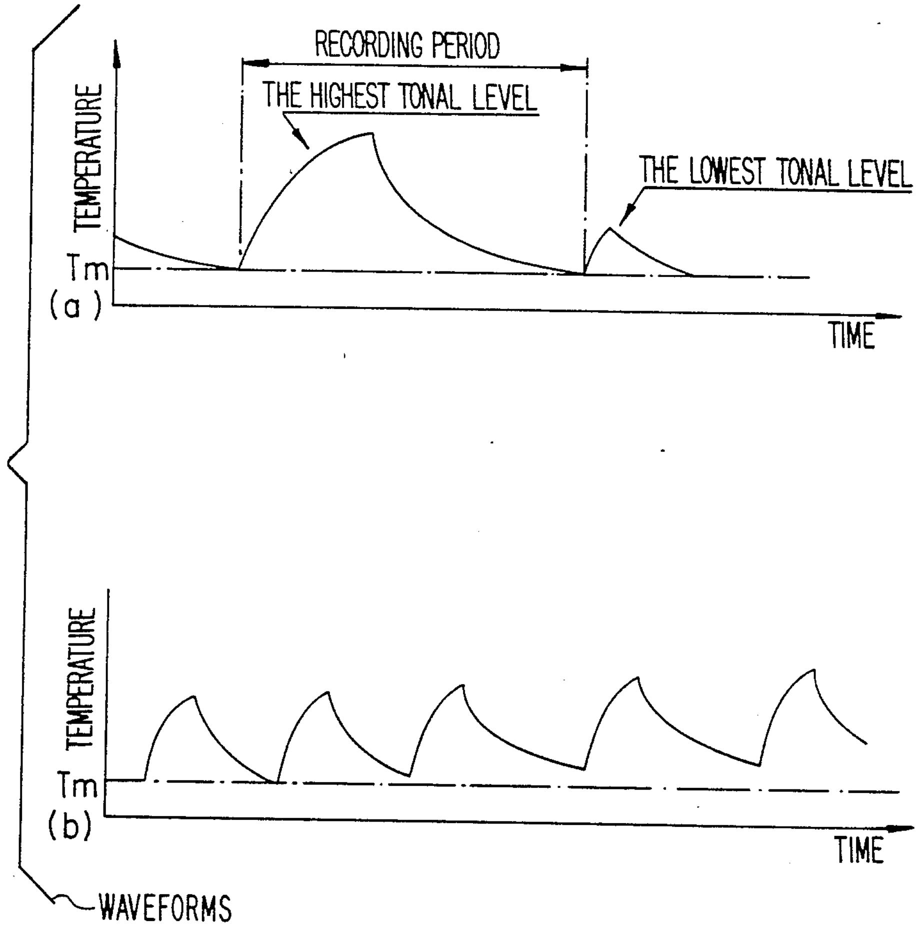
FIGS. 17(*a*) and (*b*) indicate a problem that is solved by the present invention.

First, the recording period is discussed. In case of realizing multi-level recording using a thermal head, the heat generating element temperature of the thermal head rises when a line is recorded, and therefore the next line cannot be recorded until it is sufficiently cooled. The longest cooling time is required when the recording in the lowest tonal level (almost white) is required just after recording in the highest tonal level (for example, perfect black), and the minimum value of recording is obtained for this case. Waveform (a) of FIG. 17 shows the profile of such an operation, namely, wherein the heat is stored in the vicinity of the heat generating element (glaze layer). The stored heat is transferred also to be substrate and the minimum temperature Tm rises as shown in waveform (b) of FIG. 17 because the substrate temperature rises when the long term recording is carried out continuously. For high quality recording, not effected by a rise of the minimum temperature Tm even after the recording of any data, the recording period must be determined so that recording in the lowest tonal level can be done correctly even under the worst condition, namely immediately after the infinite repetition of the recording in the highest tonal level. Here, the time—temperature characteristic of the heat generating element is as shown in equations (1) and (2). Moreover, the relation between temperature of the heat generating element and recording density is as shown in equation (3).

As explained above, time, temperature and recording density of a heat generating element is expressed by the equations (1) to (3).

With the above assumptions, for ordinary conditions, change of the recording density can be reliably prevented by addition of a pulse and by stabilization of the initial temperature by adjustment of pulse width as shown in FIG. 5, FIG. 6 and FIGS. 9 to 14, indicating how the waveforms of FIG. 5 and FIG. 6 can be implemented.

However, in the special condition where data is continuously recorded for a long period with the density almost near the maximum density, or in which the ambient temperature is excessively high, temperatures $T_a$, $T_b$ rise excessively and the temperature compensation is no longer possible. Thereby, recording may be impossible.

If thermal head temperature becomes excessively high, a general measure is to stop the recording, but, in such a case, a printer does not work as a printer when it is once stopped and the recording efficiency is lowered. Moreover, it is also possible to lower the recording density where the thermal head temperature exceeds the design value (pulse widths $W_a$, $W_b$, . . . is narrowed), but this method has a disadvantage that the recording quality is lowered.

Therefore, the present invention provides a device which can take into account the temperature rise of the thermal head, and which assures continuous operation for a long period without remarkably deteriorating the recording quality and recording performance.

Such device features explained above are characterized by providing a means for detecting temperature at the area near the heating generating element of the thermal head and means for continuously changing the recording period in accordance with the temperature detected by said detecting means so that the temperature does not rise excessively. An embodiment of the present invention with such features is explained next.

Figure 19:
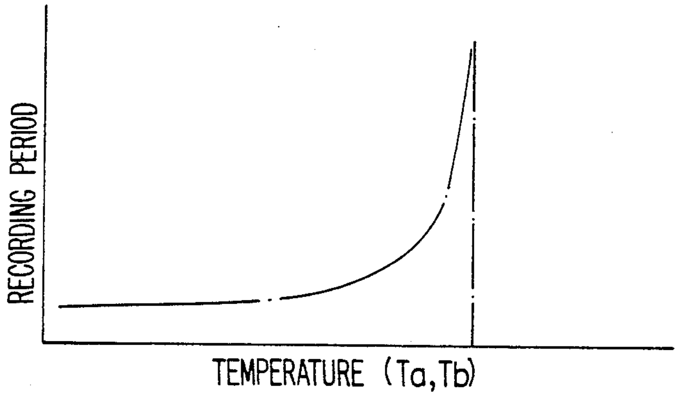
FIG. 19 indicates the desired function for changing the recording period according to temperature.
Figure 18:
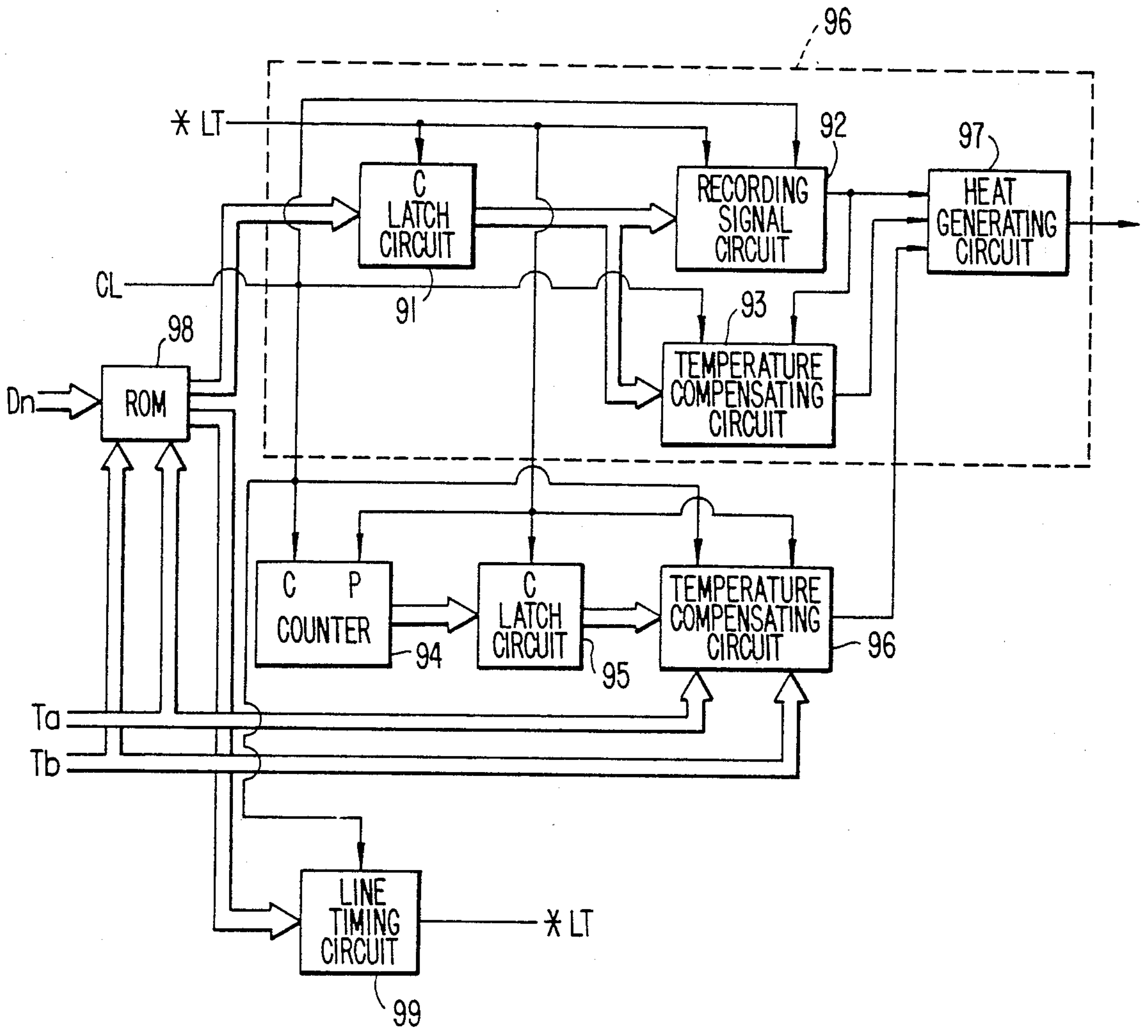
FIG. 18 shows a device for correcting the problem of FIG. 17.

As shown in FIG. 18, the line timing signal generating circuit 99 is combined with the features shown in FIG. 12. The optimum recording period corresponding to the ink sheet temperature $T_a$ and temperature $T_b$ at the area near the heat generating element are stored in the ROM 98 and the recording period can be read out according to the values of $T_a$ and $T_b$. The period read out from the ROM 98 is set to the counter (not shown) of the circuit 99, and said counter counts the clocks CL. When the counting value becomes equal to a value being set, said counter outputs the line timing signal LT, which is used as the line timing signal LT shown in FIG. 12. In FIG. 12, said signal LT is output when the setting of the recorded data for as much as a line is completed, and the temperature data is not considered. The line timing signal LT output from the circuit 99 has the period indicated by the curve of FIG. 19, which takes into account temperatures $T_a$, $T_b$ when the setting of recording data for as much as a line is completed (forecast time). In this figure, the horizontal coordinate indicates temperature, while the vertical coordinate indicates the recording period. Thereby, when the temperature of the thermal head substrate, etc. rises, the recording period is increased. Accordingly, a margin where said temperature drops is selected, and there is no chance of causing the printer to stop operation due to excessive rise of temperature. Moreover, recording quality can be improved.

Here, since it is desired to set the recording density $D_c$ to the specified value, $t_w$ for making $D_c$ of the equation (3) the desired value is obtained, and it is considered as the pulse width of the drive signal. The recording period $T_p$ is obtained corresponding to temperatures $T_a$, $T_b$ by the function shown in FIG. 19. When the pulse width $T_w$ and recording period $t_p$ are obtained, it is put into the equation (2), and thereby the heating change compensating pulse width $t_{w1}$ and the period change compensating pulse width $t_{w2}$ are obtained for setting T(t) to the desired temperature (said $T_i$). The values of $t_p$, $t_{w1}$, $t_{w2}$ are calculated for $D_c$, T, $T_d$ (corresponding to $D_n$, $T_b$, $T_a$) and are written with $D_n$, $T_b$, $T_a$ used as the address. Thereby, the relevant $t_p$, $t_w$, $t_{w1}$, $t_{w2}$ can be obtained by accessing the ROM 98 with said addresses $D_n$, $T_b$, $T_a$.

Since the desired temperature $T_i$ rises in the heating pulse addition system but does not drop (forced cooling), in the case of FIG. 5, the drive signal $P_a$ corresponding to the maximum tonal level is added, and thereby said temperature $T_i$ is set higher than the heat generating element temperature, for example, just before the next recording at the time $t_1$ where the temperature compensation is not carried out.

Thereby, the recording period can be controlled easily while the recording condition such as recording density is kept constant, the recording period can be elongated gradually before the thermal head temperature rises excessively, and the quantity of heat stored can be reduced by giving a margin of heat radiation. Thereby multi-level recording can be realized for a long period.

The thermal printer can be a line recording system or a serial recording system as explained above. Since these systems are basically the same, with regard to the drive (heating) and cooling of the heat generating element of the thermal head, the features above can be applied also to the latter system. The temperature at the area near the heat generating element $T_b$ is measured by attaching a thermistor to the thermal head and the ink sheet temperature $T_a$ can be measured by slightly abutting the thermistor to the ink sheet.

As explained above, the present invention specifies the quantity of heating by the drive signal for heating the heat generating element in accordance with the data to be recorded, and determines the application condition of the drive signal so that the heat generating element temperature at the end of recording becomes equal to that at the start of recording. Thereby the dispersion of stored heat of the heat generating element due to the drive signal is cancelled at the start of the recording. Accordingly, the condition of the drive signal can be specified with only the data to be recorded, and complicated calculations can be saved. As a result, the quantity of heating can be controlled with high precision and recording speed can also be improved.

In addition, long term recording can be realized without deteriorating the accuracy of tonal level, by controlling the recording period with the temperature at the area near the heat generating element of the thermal head and the ink sheet temperature during the recording of tonal images.

We claim:

1. A thermal printer comprising a heat generating element for heating a recording medium to provide a selected one of a plurality of recording tones for each of a plurality of successive recording periods, control means for controlling said heat generating element to provide a respective recording signal corresponding to each said selected recording tone for each respective recording period, for stopping said providing of each said recording signal to allow the temperature of said heat generating element to fall below a first predetermined value, and for subsequently providing a heating change compensation signal to said heat generating element for returning said heat generating element to a second predetermined temperature at the end of each said recording period, wherein, after each said recording signal is stopped by said control means, the temperature history of said heat generating element is effectively independent of the respective history of recording.

2. The printer of claim 1, wherein said control means senses a temperature effecting said plurality of recording tones, other than the temperature of said heat generating element, and adjusts the length of the recording period to maintain said plurality of recording tones.

3. The printer of claim 2, wherein said control means senses ambient temperature and the temperature of said recording medium, for the adjusting of the length of the recording period.

4. The printer of claim 1 or 2, wherein said heating change compensation signal is the same for each said recording signal.

5. The printer of claim 4, wherein said control means applies, during each said recording period and after the respective heating change compensation signal, a start time temperature compensation signal that is independent of the particular value of each said recording signal, for the providing of said heat generating element with said second predetermined temperature at the end of each said recording period.

6. The printer of claim 4, wherein each said recording signal begins at the beginning of the respective recording period, and each said recording signal corresponding to a lower temperature of said heat generating element continues longer into each respective recording period than any corresponding to a higher temperature.

7. The printer of claim 6, wherein each said recording signal corresponding to a different one of said plurality of recording tones has a respective length.

8. The printer of claim 6, wherein said heating change compensation signal is a pulsed signal.

9. The printer of claim 5, wherein each said start time temperature compensation signal depends on the length of the respective recording period.

10. A thermal printer assembly comprising a plurality of thermal printers each according to the thermal printer of claim 5.

11. The assembly of claim 10, wherein a respective part of each said control means, for providing each said start time temperature compensation signal, is comprised in common by a start time compensation means for providing the same start time temperature compensation signal to each said heat generating element, and wherein respective tonal data specifying said recording tones for said recording periods for each said heat generating element is applied to the other part of each said control means for determining the respective recording signal of each said recording period of each said heat generating element.

12. The printer of claim 1, 2 or 3, wherein each said recording signal has a waveform to cause said heat generating element to rise to a respective temperature corresponding to the respective recording tone, and to remain at said respective temperature for a respective period of time that decreases with increase in said respective temperature.

13. The printer of claim 12, wherein said waveform of each said recording signal has a first part of a constant amplitude for a period depending on the respective recording tone, wherein said control means is such that the power provided to said heat generating element corresponds to the amplitude of said waveform.

14. The printer of claim 13, wherein said waveform of each said recording signal has a second part adjacent to and following said first part, wherein each said second part comprises a plurality of pulses having a period depending on the respective recording tone.

15. The printer of claim 13, wherein said waveform of each said recording signal has a second part adjacent to and following said first part, wherein each said second part has a constant value of magnitude depending on the respective recording tone.

* * * * *